T. L. KANE.
PITCH ASCERTAINING ATTACHMENT FOR SOUND REPRODUCING RECORDS.
APPLICATION FILED MAR. 13, 1915.
1,172,533.
Patented Feb. 22, 1916.
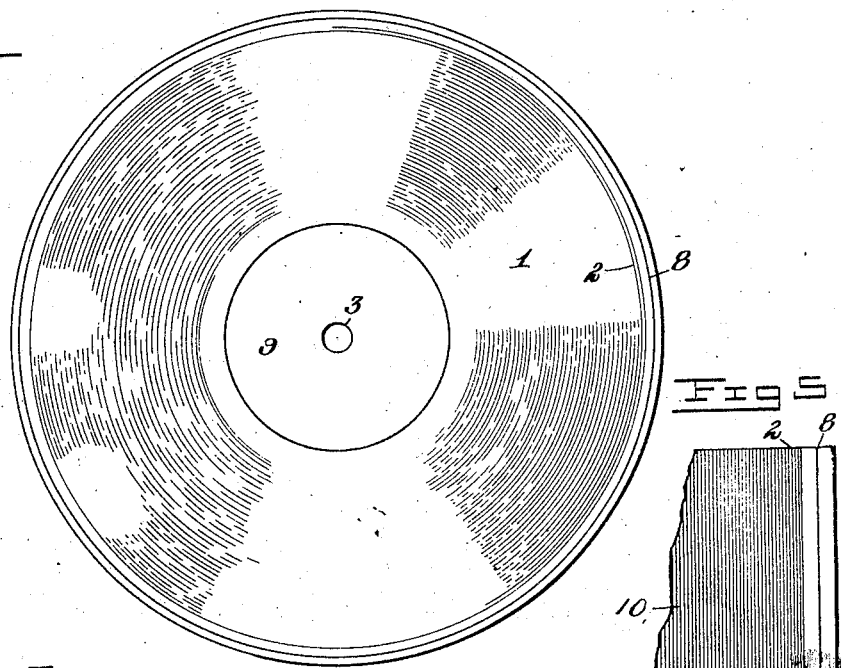
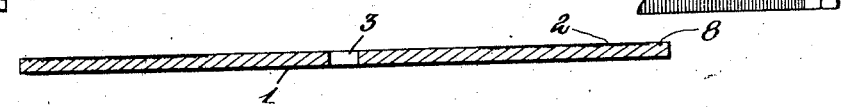
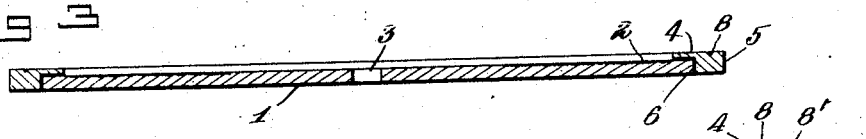
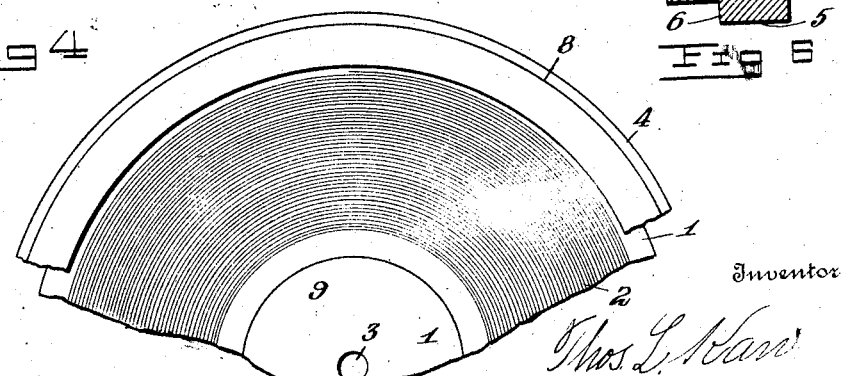
Witnesses
H. G. Rohrwell
Samuel B. Crandall
Inventor
Thos. L. Kane
By Adrian Felger
his Attorney

UNITED STATES PATENT OFFICE.

THOMAS L. KANE, OF KANE, PENNSYLVANIA.

PITCH-ASCERTAINING ATTACHMENT FOR SOUND-REPRODUCING RECORDS.

1,172,533.   Specification of Letters Patent.   Patented Feb. 22, 1916.

Application filed March 13, 1915. Serial No. 14,110.

*To all whom it may concern:*

Be it known that I, THOMAS L. KANE, a citizen of the United States, residing at Kane, in the county of McKean and State of Pennsylvania, has invented certain new and useful Improvements in Pitch-Ascertaining Attachments for Sound-Reproducing Records, of which the following is a specification.

The primary object of this invention is to facilitate the use of the phonograph, graphophone, and other similar music reproducing instruments, as an accompaniment in the teaching of music, and especially in the teaching of absolute pitch, by providing means for ascertaining the correct pitch at which any record element was produced.

A further object of this invention is to provide for applying my improvement, comprising the means of ascertaining the correct pitch, by a separate attachment, which may be made and sold as an independent article of manufacture, and applied to existing sound reproducing records now in common use, or my invention may be applied to the record during its manufacture.

Another object of this invention is to facilitate the application of my improvement, comprising the means of ascertaining the correct pitch, to any record now in use by the student of music, or by any operator of sound reproducing instruments.

With the foregoing and other objects in view which will appear as the description proceeds, my invention resides in the combination and arrangement of parts, and in the details of construction hereinafter described and claimed. It being understood that changes in the precise embodiment of the invention herein disclosed can be made within the scope of what is claimed without departing from the spirit of the invention.

In order that my invention may be fully understood, attention is hereby directed to the accompanying drawings forming a part of this specification, and in which, Figure 1, is a plan view of a disk record with the pitch groove inscribed thereon. Fig. 2, is a centrally sectional elevation of the record showing the pitch groove inscribed thereon. Fig. 3, is a view similar to Fig. 2, showing a modification of my invention comprising a detachable ring having the pitch groove inscribed thereon. Fig. 4, is a fragmentary plan view of a portion of the record with the modification, comprising the detachable ring applied thereto. Fig. 5, is a fragmentary side view of a portion of a cylinder record with the pitch groove inscribed thereon. Fig. 6, is an enlarged detail view of a section of the detachable ring with modification, comprising an annular recess on the top surface adapted to be filled with a softer composition such as wax from which cylinder records are made.

Referring to all figures of the drawings, the numeral 1, designates a disk sound record provided with the usual spiral sound groove 2, and the centering aperture 3.

As particularly shown in Fig. 3, a detachable ring 4, is provided, composed of any suitable material, but preferably of such material as is used in the manufacture of sound producing records. The outer portion 5 of the ring is of greater diameter than the disk and an annular channel is provided in the lower portion of the ring, one wall 6 of the channel positively engaging the edge of the disk. The ring 4, may be suitably attached to the record by an adhesive medium or otherwise, and thereby additionally reinforcing the disk against breakage.

In the application of my invention I provide for placing upon the free space near the outer edge of the record, between the outer edge or periphery and the point of the commencement of the spiral phonetic groove 2, or upon the annular face of the ring 4; an annular groove 8, having a substantial V-shaped indenture somewhat deeper than the spiral groove 2, to facilitate placing the stylus of the phonograph readily in position therein. Within this annular groove 8, is recorded either at the time of the manufacture of the record, or subsequently, a clear note in perfect pitch with the instrument, or with the voice from which the record is a reproduction, and for the purposes of readily ascertaining the pitch note by the operator, I provide for inscribing upon the record in addition to the title of the selection, in the usual place, as at 9, the key in which it is played, and at the point where the pitch note is inscribed the letter "A" or such other letter or name indicating the note used as a pitch note.

In Fig. 5, is shown the adaptation of my invention to a cylinder record wherein the pitch groove 8, is shown placed at the end of the cylinder before the beginning of the phonetic spiral groove 2. In the use of a wax cylinder the student may create his own pitch groove 8, is shown placed at the end which the recordation in the phonetic groove was made.

In Fig. 6, is illustrated another modification of my invention wherein there is provided an annular recessed depression 8', in the face of the ring 4, adapted to be filled with a composition such as the wax from which the common form of cylinder record is made.

In the use of this modification, the student can produce from some correctly tuned instrument as a piano, upon the wax surface within the depression 8', a pitch note; or any good musician can with little trouble create his own pitch indentation after finding the true pitch in which the phonograph record was originally rendered.

By the use of my invention it will be readily appreciated by those skilled in the art, that a great deal of pleasure will be derived by being able to play their favorite instrument either accompanied by, or as an accompaniment to, a good phonograph record, thus giving them the pleasure of playing as it were, with the world's best artists.

The great drawbacks heretofore experienced in using the graphophone record as an accompaniment with other musical instruments has been the difficulty of having the two instruments in perfect pitch with one another.

It is common knowledge that the alteration of the rotative speed at which a record is driven, will cause a corresponding alteration of the pitch, in which the selection on the record will be produced.

As practically all of the several record rotating machines now in common use, are provided with a speed control or governor the operator may adjust the speed at substantially the same rate of rotation as that used at the time the record was made, and by these means the true pitch of the phonograph record can at once be obtained and sounded until the two instruments are in tune.

To illustrate the operation of the means embodying my invention: Middle "A" being the tone most commonly used by musicians in tuning their instruments, this (middle "A") should be sounded on a correctly tuned musical instrument, or by a tuning fork, in perfect pitch with the instrument or voice rendering the selection producing the record, and by the adjustment on the phonograph, the rotative speed of the record may be increased or decreased until the tones of the two instruments are in tune.

In the case of a piano or organ which are difficult for the student to tune, the phonograph reproduction can be tuned by means of the adjustment of the governor which varies the rate of rotative speed of the record, thus lowering or raising the pitch to that of the piano or organ. On the other hand in the case of such instruments as the violin, mandolin, cornet, or clarinet, these instruments being more easily tuned by the student, these can be tuned until their pitch is identical with that of the phonograph. Thus, in adapting the phonograph to the piano, the stylus is placed in the pitch groove 8, of the rotating record, the middle "A" is struck by the student on the piano, and by the adjustment of the speed of the record rotator, it may be increased or decreased until the two tones are in tune. When this adjustment has been accomplished, the stylus is placed in the spiral at the beginning of the phonetic groove 2, on the record to commence the playing of the selection thereon and the piano accompaniment may then be played, which if not known by memory, can readily be obtained, if the key in which it was rendered is written on the record. After the correct regulation of speed of the disk rotator has been found, it can be written on the record for future use, thus obviating the necessity of retuning.

In the adaption of the violin, the stylus is placed in the usual way, in the tone pitch indenture 8, and as it gives the note "A"—, the "A" string of the violin is tuned to the tone pitch and the rest of the violin to accord. The same general principles may be applied in respect to other instruments.

By the use of the above described means embodying my invention, the amateur pianists can learn to accompany any song as though he or she were accompanying a great vocal artist. The violinist can play obligatos to the greatest singers or be accompanied by the best of piano accompanists or orchestra, in fact the advantages to the student and the home lover of good music are many and the changes innumerable.

Having thus described my invention, what I claim as new and desire to obtain by Letters Patent is:

1. In a device of the class described, a record disk and independent means carried above the upper surface of the disk, at the edge thereof in a plane parallel with said surface for receiving a record of sound vibrations, said means comprising a ring having channels on the opposite sides thereof, one of the channels being adapted to receive the record.

2. An attachment for a graphophone disk comprising a ring formed of material adapted to receive a record, having a greater diameter than said disk and adapted to be carried upon the latter, the inner portion of the ring being cut away on its lower side to form an annular channel for gripping the edge of the disk, the upper surface of the ring overlapping the upper surface of the disk and carrying means for actuating a stylus for reproducing a given pitch and sustaining the latter.

3. An attachment for a graphophone disk comprising a ring formed of material adapted to receive a record, having a greater diameter than said disk and adapted to be carried upon the latter, the inner portion of the ring being cut away on its lower side to form an annular channel for gripping the edge of the disk, the upper surface of the ring overlapping the upper surface of the disk and carrying means for actuating a stylus for reproducing a given pitch, said means including a countersunk ring of material of less density than that forming the first ring.

4. The combination with a disk record, of a supplementary record having frictional engagement with the edge of the first record, and having a plurality of independent record surfaces in a given plane above the plane of said first mentioned record.

In testimony whereof I have affixed my signature in presence of two witnesses.

THOMAS L. KANE.

Witnesses:
H. C. SWANSON,
C. C. DAVIS.